(12) United States Patent
Pally et al.

(10) Patent No.: US 11,965,421 B2
(45) Date of Patent: Apr. 23, 2024

(54) METHOD FOR WATERPROOFING OF TUNNEL STRUCTURES

(71) Applicant: SIKA TECHNOLOGY AG, Baar (CH)

(72) Inventors: Otmar Pally, Wangen an der Aare (CH); Isabel Siegrist, Sachseln (CH)

(73) Assignee: SIKA TECHNOLOGY AG, Baar (CH)

( * ) Notice: Subject to any disclaimer, the term of this patent is extended or adjusted under 35 U.S.C. 154(b) by 237 days.

(21) Appl. No.: 17/540,387

(22) Filed: Dec. 2, 2021

(65) Prior Publication Data

US 2022/0170369 A1 Jun. 2, 2022

(30) Foreign Application Priority Data

Dec. 2, 2020 (EP) .................................... 20211375

(51) Int. Cl.
| | |
|---|---|
| *E21D 11/38* | (2006.01) |
| *B32B 5/02* | (2006.01) |
| *B32B 7/14* | (2006.01) |
| *B32B 13/12* | (2006.01) |
| *B32B 27/12* | (2006.01) |
| *B32B 27/32* | (2006.01) |
| *B32B 37/12* | (2006.01) |
| *C09J 7/20* | (2018.01) |

(Continued)

(52) U.S. Cl.
CPC ............ *E21D 11/383* (2013.01); *B32B 5/022* (2013.01); *B32B 7/14* (2013.01); *B32B 13/12* (2013.01); *B32B 27/12* (2013.01); *B32B 27/32* (2013.01); *B32B 37/1292* (2013.01); *C09J 7/20* (2018.01); *C09J 7/385* (2018.01); *C09J 7/405* (2018.01); *B32B 2307/718* (2013.01); *B32B 2307/7265* (2013.01); *B32B 2315/06* (2013.01); *B32B 2323/00* (2013.01); *C09J 2301/302* (2020.08); *C09J 2400/263* (2013.01); *C09J 2433/00* (2013.01)

(58) Field of Classification Search
CPC ......... E21D 11/383; B32B 5/022; B32B 7/14; B32B 13/12; B32B 27/12; B32B 27/32; B32B 37/1292; B32B 2307/718; B32B 2307/7265; B32B 2315/06; B32B 2323/00; C09J 7/20; C09J 7/385; C09J 7/405; C09J 2301/302; C09J 2400/263; C09J 2433/00
See application file for complete search history.

(56) References Cited

FOREIGN PATENT DOCUMENTS

| EP | 3 643 494 A1 | 4/2020 |
|---|---|---|
| KR | 20080021411 A * | 3/2008 |

(Continued)

OTHER PUBLICATIONS

May 17, 2021 Search Report issued in European Patent Application No. 20211375.

*Primary Examiner* — Janine M Kreck
(74) *Attorney, Agent, or Firm* — Oliff PLC

(57) ABSTRACT

A method for waterproofing a substrate includes steps of: attaching a separation sheet to the surface of the substrate; and attaching a waterproofing membrane sheet to a surface of the separation sheet by a plurality of adhesive elements having a first and second major adhesive surface, wherein the separation sheet is a non-woven fabric sheet, or an embossed polyolefin membrane sheet and each adhesive element includes an adhesive layer composed of a pressure sensitive adhesive.

17 Claims, 4 Drawing Sheets

(51) Int. Cl.
*C09J 7/38* (2018.01)
*C09J 7/40* (2018.01)

(56) References Cited

FOREIGN PATENT DOCUMENTS

| WO | WO-2005040555 A1 * | 5/2005 | ........... E21D 11/383 |
| WO | WO-2005080521 A1 * | 9/2005 | ............... B01D 3/38 |
| WO | 2013/063197 A1 | 5/2013 | |

* cited by examiner

METHOD FOR WATERPROOFING OF TUNNEL STRUCTURES

TECHNICAL FIELD

The invention relates to the field of waterproofing of below ground building constructions by using water impermeable membranes. In particular, the invention relates to a method for waterproofing of constructions in tunnels using waterproofing membranes.

BACKGROUND OF THE INVENTION

In the field of construction polymeric sheets, which are often referred to as membranes, are used to protect underground and above ground constructions, such as basements, tunnels, and flat and low-sloped roofs, against penetration water. Membranes are applied, for example, to prevent ingress of water through cracks that develop in the concrete structure due to construction settlement, load deflection or concrete shrinkage. Commonly used materials for waterproofing membranes include plastics, particularly thermoplastics such as plasticized polyvinylchloride (p-PVC), thermoplastic polyolefins (TPE-O, TPO), and (crosslinked) elastomers such as ethylene-propylene diene monomer (EPDM) rubber. Bituminous materials are also used for providing waterproofing membranes since they provide good resistance against environmental factors combined with relatively low costs compared to thermoplastic polymer materials.

In waterproofing applications, the membrane is typically post-applied to an existing concrete structure. In these applications, the membrane is attached by adhesive or mechanical fastening means to the surface of the concrete structure to be waterproofed. In pre-applied waterproofing applications, the membrane is laid out before the concrete structure to be waterproofed is built. In this case, the membrane is placed on an underlying structure, typically on a blinding concrete layer, or a tubbing segment or a shotcrete layer in tunneling applications, or a formwork and fresh concrete is then casted against the surface of the membrane, thereby fully and permanently bonding the membrane to the surface of the hardening concrete.

In tunneling applications, a separation layer, typically a layer of fabric material, such as geotextile, is provided between the concrete structure and the waterproofing membrane to provide the necessary drainage function. Depending on the selected waterproofing technology, the concrete structure to be waterproofed can be an outer concrete lining layer, a tunnel tubbing segment, or a layer of shotcrete. The separation layer is typically attached to the concrete structure by using mechanical fastening means or by adhesive means. The separation layer can, for example, be attached to the concrete structure by using fixing discs and nails, which are installed through the disc and are designed to penetrate into the concrete structure with a desired depth. The waterproofing membrane can then be adhered to the discs, for example, by heat welding, by adhesive means, or by using hook and loop (e.g. Velcro) fixing means. Alternatively, the separation layer can be provided as pre-applied on the waterproofing membrane. Such fleece-backed waterproofing membranes can then be adhered directly to the surface of the concrete structure by adhesive means, such as by using a hot-melt adhesive. In these applications, the adhesive is first applied on the surface of the concrete structure and a fleece-backed waterproofing membrane is then adhered to the surface of the concrete structure via the adhesive layer.

All prior art techniques for waterproofing of tunnel structures are known suffer from some disadvantages. The use of fixation discs increases the costs of the installation process, especially in case heat welding is used to adhere the waterproofing membrane to the discs, since the installation requires use of specialized equipment and highly trained work force. Use of hot-melt adhesives requires melting of the adhesive and application of the adhesive as a melt to the surface of the substrate to be waterproofed, which can only be conducted with specialized equipment designed for the tunnel environment.

There is thus a need for new type of method for waterproofing of tunnel structures, which overcomes the aforementioned drawbacks.

SUMMARY OF THE INVENTION

The object of the present invention is to provide an improved method for waterproofing of concrete structures, particularly tunnel structures, by using commercially available waterproofing membranes.

It was surprisingly found out that these objects can be achieved by the features of claim 1. The core of the invention is that a waterproofing membrane sheet is directly attached to a separation sheet by means of a plurality of adhesive elements.

One of the advantages of the method is that fixation discs are no longer needed between the waterproofing membrane sheet and the separation sheet, which simplifies the method for waterproofing of a tunnel structure. Furthermore, since the waterproofing membrane sheet does not have to be heat-welded to the discs, the need for special equipment and highly trained work force is significantly reduced.

Further subjects of the present invention are presented in other independent claims. Preferred aspects of the invention are presented in the dependent claims.

DETAILED DESCRIPTION OF THE INVENTION

Figure 1:
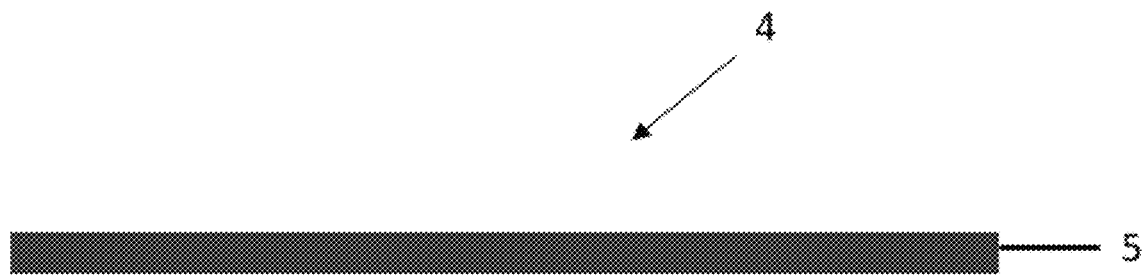
FIG. 1 shows a cross-section of an adhesive element (4) composed of an adhesive layer (5).

The subject of the present invention is a method for waterproofing a substrate (1) comprising steps of:

i) Attaching a separation sheet (2) to the surface of the substrate (1) and ii) Attaching a waterproofing membrane sheet (3) to a surface of the separation sheet (2) by means of a plurality of adhesive elements (4) having a first and second major adhesive surface, wherein the separation sheet (2) is a non-woven fabric sheet or an embossed polyolefin membrane sheet and each adhesive element (4) comprises an adhesive layer (5) composed of a pressure sensitive adhesive.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "polyolefin" designates polymers and copolymers produced solely from olefin monomers.

The term "molecular weight" refers to the molar mass (g/mol) of a molecule or a part of a molecule, also referred to as "moiety". The term "average molecular weight" refers to the number average molecular weight (Mn) of an oligomeric or polymeric mixture of molecules or moieties. The molecular weight may be determined by gel permeation chromatography.

The term "melting temperature" refers to a temperature at which a material undergoes transition from the solid to the liquid state. The melting temperature ($T_m$) is preferably determined by differential scanning calorimetry (DSC) according to ISO 11357-3 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The term "glass transition temperature" ($T_g$) designates the temperature above which temperature a polymer component becomes soft and pliable, and below which it becomes hard and glassy. The glass transition temperature is preferably determined by dynamical mechanical analysis (DMA) as the peak of the measured loss modulus (G") curve using an applied frequency of 1 Hz and a strain level of 0.1%.

The "amount or content of at least one component X" in a composition, for example "the amount of the at least one thermoplastic polymer" refers to the sum of the individual amounts of all thermoplastic polymers contained in the composition. Furthermore, in case the composition comprises 20 wt.-% of at least one thermoplastic polymer, the sum of the amounts of all thermoplastic polymers contained in the composition equals 20 wt.-%.

The term "normal room temperature" designates a temperature of 23° C.

Preferably, step i) of the method for waterproofing a substrate is conducted before step ii) of the method.

The term "sheet" refers in the present disclosure to essentially planar elements having first and second major surfaces, i.e. top and bottom surfaces, and a thickness defined between the first and second major surfaces. Preferably, a sheet has a length and width at least 5 times, preferably at least 15 times, more preferably at least 25 times greater than the thickness of the sheet. The term "waterproofing membrane" refers to membranes comprising at least one waterproofing layer that restricts water from passing through the membrane.

The separation sheet is typically arranged between the surface of the substrate to be waterproofed and the waterproofing membrane sheet to separate the waterproofing membrane from the surface of the substrate and to protect the waterproofing membrane from the mechanical impacts of the surrounding concrete structure.

The separation sheet can be a non-woven fabric sheet or an embossed polyolefin membrane sheet.

The term "non-woven fabric" refers here to materials that are composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the non-woven fabric. In chemical bonding, chemical binders such as adhesive materials are used to hold the fibers together in a non-woven fabric. Typical materials for the non-woven fabrics include synthetic organic and inorganic fibers.

Suitable synthetic organic fibers for the non-woven fabric sheet used as the separation sheet include polyester fibers, polypropylene fibers, polyethylene fibers, nylon fibers, and polyamide fibers whereas suitable inorganic fibers include glass fibers, aramid fibers, wollastonite fibers, and carbon fibers.

The term "polyolefin membrane" refers membranes that contain polyolefins as the major polymer component and the term "embossed membrane" refers to membranes containing raised or depressed surface structures created during the production process of the membrane. The embossed polyolefin membrane may be a single-ply membrane comprising exactly one polyolefin layer or a multi-ply membrane comprising two or more polyolefin layers.

Suitable polyolefins for the embossed polyolefin membrane sheet include, for example, polyethylenes, such as low-density polyethylene, linear low-density polyethylene, very-low-density polyethylene, ultra-low-density polyethylene, medium-density polyethylene, polypropylene, polybutene-1, ethylene-α-olefin random and block copolymers and propylene-α-olefin random and block copolymers.

The thickness of the embossed polyolefin membrane sheet, including the embossing, is preferably in the range of 0.25-5 mm, preferably 0.5-3.5 mm, more preferably 1-3 mm. The thickness of a membrane sheet can be measured by using the method defined in EN 1849-2:2019 standard.

The separation sheet can be attached to the surface of the substrate by using any conventional adhering means, such as by using mechanical fixation means or adhesive means, preferably by using mechanical fixation means. Suitable mechanical fixation means include, for example, nails or screws having a sufficient length, such as of at least 50 mm, preferably at least 100 mm, to penetrate through the separation sheet and into the substrate to a desired depth to provide suitable bonding strength between the separation sheet and the substrate. Suitable adhesive means for attaching the separation sheet to the substrate include, for example, hot melt adhesives, pressure sensitive adhesives, and solvent and water-based adhesives.

According to one or more embodiments, the separation sheet is a non-woven fabric sheet.

According to one or more embodiments, the non-woven fabric sheet comprises or consists of the synthetic organic fibers, preferably selected from the group consisting of polyester fibers, polypropylene fibers, polyethylene fibers, nylon fibers, and polyamide fibers, more preferably of polypropylene fibers, polyethylene fibers.

The preferred thickness of the non-woven fabric sheet depends on the application, particularly on the type of the substrate to be waterproofed. In case the substrate is a layer of shotcrete instead of a concrete lining layer of a tunnel or a tunnel tubbing segment, separation sheets having a higher thickness are typically preferred.

Preferably, the non-woven fabric sheet has a mass per unit area of at least 250 g/m2, more preferably at least 300 g/m$^2$, even more preferably at least 350 g/m$^2$, still more preferably at least 450 g/m$^2$. The mass per unit area of a non-woven fabric can be determined by measuring the mass of test piece of the non-woven fabric having a given area and dividing the measured mass by the area of the test piece. Preferably, the mass per unit area of a non-woven fabric is determined as defined in ISO 9073-18:2007 standard.

According to one or more embodiments, the non-woven fabric sheet has a mass per unit are in the range of 250-1500 g/m$^2$, preferably 350-1250 g/m$^2$, more preferably 450-1000 g/m$^2$.

The substrate to be waterproofed is preferably a concrete substrate, more preferably an outer concrete lining layer of a tunnel, a tunnel tubbing segment, or a shotcrete layer.

The term "tubbing" refers to prefabricated steel-reinforced concrete parts, which are used in mechanical tunnel construction to provide the outer shell of the tunnel bore. During installation, the tubbing segments are picked up by a tubbing setting device, the so-called "erector," and assembled into a tubbing ring under the protection of the shield of a tunnel drilling machine. This type of tunnel construction technique is also known as "shield drive technique" and it is especially used for construction of traffic tunnels. The term "shotcrete" refers to a special type of concrete (or sometimes mortar), also known as "gunite" or "sprayed concrete", which is conveyed through a hose and pneumatically projected at high velocity onto a surface to form a concrete layer. Shotcrete is commonly used to line tunnel walls and in mines.

The waterproofing membranes are typically provided in a form of prefabricated articles, which are delivered to the construction site in form of rolls, which are then unwounded and cut to provide waterproofing membrane sheets having length exceeding the width. The term "width" and "length" refer to the two perpendicular dimensions measured in the horizontal plane of the first and second major surfaces of a sheet-like element. Generally, the "width" of a sheet like element is the smaller of the horizontal dimensions of a sheet-like element. Consequently, the "width" of the waterproofing membrane sheet refers to the minor dimension measured in the horizontal plane of the waterproofing membrane sheet in a direction perpendicular to the length of the waterproofing membrane sheet.

According to one or more embodiments, the waterproofing membrane sheet has a width of 0.5-5 m, preferably 1-4 m, more preferably 1.5-3.5 m, even more preferably 1.5-3 m. The length of the waterproofing membrane sheet depends on the dimensions of the substrate, for example on the diameter of the tunnel wall to be waterproofed. It may be preferred that the length of the waterproofing membrane sheet is not more than 20 m, such as not more than 15 m.

The waterproofing membrane sheet preferably comprises at least one polymeric waterproofing layer. The term "polymeric layer" refers in the present disclosure to a layer comprising a continuous phase composed of one or more polymers.

Preferably, the polymeric waterproofing layer has a thickness of at least 0.25 mm, more preferably at least 0.45 mm, even more preferably at least 0.55 mm, still more preferably at least 0.75 mm. According to one or more embodiments, the polymeric layer has a thickness of 0.25-10 mm, preferably 0.35-7.5 mm, more preferably 0.5-5 mm, even more preferably 1-5 mm, still more preferably 1-3.5 mm. The thickness of the polymeric layer can be determined by using the measurement method as defined in DIN EN 1849-2 standard.

Polymeric waterproofing layers having a thickness falling within the above presented ranges have been found out to provide the waterproofing membrane with adequate mechanical stability and water tightness.

According to one or more embodiments, the waterproofing membrane is a single-ply waterproofing membrane comprising exactly one polymeric waterproofing layer.

According to one or more embodiments, the polymeric waterproofing layer comprises at least 50 wt.-%, preferably at least 60 wt.-%, more preferably at least 70 wt.-%, even more preferably at least 80 wt.-%, based on the total weight of the polymeric waterproofing layer, of at least one polymer P1.

Suitably polymers used as the at least one polymer P1 include, for example, polyolefins, halogenated polyolefins, polyvinylchloride, ethylene vinyl acetate copolymers, polyethylene terephthalate, polystyrene, polyamides, and rubbers including chemically crosslinked and non-crosslinked types of the above listed polymers. The term "chemically crosslinked" is understood to mean that the polymer chains are inter-connected by a plurality of covalent bonds, which are mechanically and thermally stable.

The term "rubber" refers to any polymer or a blend of polymers, which can recover from large deformations. Typical rubbers are capable of being elongated or deformed to at least 200% of their original dimension under an externally applied force, and will substantially resume the original dimensions, sustaining only small permanent set (typically no more than about 20%), after the external force is released.

According to one or more embodiments, the at least one polymer P1 is selected from the group consisting of polyolefins, halogenated polyolefins, polyvinylchloride, ethylene vinyl acetate copolymers, ethylene propylene diene monomer rubber, butyl rubber, halogenated butyl rubber, natural rubber, chloroprene rubber, synthetic 1,4-cis-polyisoprene, polybutadiene, ethylene-propylene rubber, styrene-butadiene rubber, isoprene-butadiene copolymer, styrene-isoprene-butadiene rubber, methyl methacrylate-butadiene copolymer, methyl methacrylate-isoprene copolymer, acrylonitrile-isoprene copolymer, acrylonitrile-butadiene copolymer, and silicone rubber, preferably from the group consisting of polyolefins, halogenated polyolefins, polyvinylchloride, ethylene vinyl acetate copolymers, and ethylene propylene diene monomer rubber.

Suitable polyolefins for use as the at least one polymer P1 include polyethylenes, ethylene copolymers, polypropylenes, and propylene copolymers.

Suitable polyethylenes include low density polyethylene (LDPE), linear low density polyethylene (LLDPE), and high density polyethylene (HDPE), preferably having a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

Suitable ethylene copolymers include random and block copolymers of ethylene and one or more $C_3$-$C_{20}$ α-olefin monomers, in particular one or more of propylene, 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of ethylene-derived units, based on the weight of the copolymer.

Suitable ethylene random copolymers include, for example, ethylene-based plastomers, which are commercially available, for example, under the trade name of Affinity®, such as Affinity® EG 8100G, Affinity® EG 8200G, Affinity® SL 8110G, Affinity® KC 8852G, Affinity® VP 8770G, and Affinity® PF 1140G (all from Dow Chemical Company); under the trade name of Exact®, such as Exact® 3024, Exact® 3027, Exact® 3128, Exact® 3131, Exact® 4049, Exact® 4053, Exact® 5371, and Exact® 8203 (all from Exxon Mobil); and under the trade name of Queo® (from *Borealis* AG) as well as ethylene-based polyolefin elastomers (POE), which are commercially available, for example, under the trade name of Engage®, such as Engage® 7256, Engage® 7467, Engage® 7447, Engage® 8003, Engage® 8100, Engage® 8480, Engage® 8540, Engage® 8440, Engage® 8450, Engage® 8452, Engage® 8200, and Engage® 8414 (all from Dow Chemical Company).

Suitable ethylene-α-olefin block copolymers include ethylene-based olefin block copolymers (OBC), which are commercially available, for example, under the trade name of Infuse®, such as Infuse® 9100, Infuse® 9107, Infuse® 9500, Infuse® 9507, and Infuse® 9530 (all from Dow Chemical Company).

Suitable polypropylenes include polypropylene homopolymers, such as isotactic polypropylene (iPP), syndiotactic polypropylene (sPP), and homopolymer polypropylene (hPP), preferably having a melting temperature ($T_m$) determined by differential scanning calorimetry (DSC) according to ISO 11357-3:2018 standard using a heating rate of 2° C./min of at or above 100° C., preferably at or above 105° C., more preferably at or above 110° C.

Suitable propylene copolymers include propylene-ethylene random and block copolymers and random and block copolymers of propylene and one or more $C_4$-$C_{20}$ α-olefin monomers, in particular one or more of 1-butene, 1-pentene, 1-hexene, 1-heptene, 1-octene, 1-decene, 1-dodecene, and 1-hexadodecene, preferably comprising at least 60 wt.-%, more preferably at least 65 wt.-% of propylene-derived units, based on the weight of the copolymer.

Suitable propylene random and block copolymers are commercially available, for example, under the trade names of Versify®, Intune®, and Infuse® (from Dow Chemical Company) and under the trade name of Vistamaxx® (from Exxon Mobil).

Further suitable propylene copolymers include heterophasic propylene copolymers. These are heterophasic polymer systems comprising a high crystallinity base polyolefin and a low-crystallinity or amorphous polyolefin modifier. The heterophasic phase morphology consists of a matrix phase composed primarily of the base polyolefin and a dispersed phase composed primarily of the polyolefin modifier. Suitable commercially available heterophasic propylene copolymers include reactor blends of the base polyolefin and the polyolefin modifier, also known as "in-situ TPOs" or "reactor TPOs or "impact copolymers (ICP)", which are typically produced in a sequential polymerization process, wherein the components of the matrix phase are produced in a first reactor and transferred to a second reactor, where the components of the dispersed phase are produced and incorporated as domains in the matrix phase. Heterophasic propylene copolymers comprising polypropylene homopolymer as the base polymer are often referred to as "heterophasic propylene copolymers (HECO)" whereas heterophasic propylene copolymers comprising polypropylene random copolymer as the base polymer are often referred to as "heterophasic propylene random copolymers (RAHECO)". The term "heterophasic propylene copolymer" encompasses in the present disclosure both the HECO and RAHECO types of the heterophasic propylene copolymers.

Suitable heterophasic propylene copolymers include reactor TPOs and soft TPOs produced with LyondellBasell's Catalloy process technology, which are commercially available under the trade names of Adflex®, Adsyl®, Clyrell®, Hifax®, Hiflex®, and Soften®, such as Hifax® CA 10A, Hifax® CA 12A, and Hifax® CA 60 A, and Hifax CA 212 A. Further suitable heterophasic propylene copolymers are commercially available under the trade name of Borsoft® (from *Borealis* Polymers), such as Borsoft® SD233 CF.

Suitable copolymers of ethylene and vinyl acetate include those having a content of a structural unit derived from vinyl acetate in the range of 4-90 wt.-%, preferably 6-80 wt.-%, more preferably 8-70 wt.-%, based on the weight of the copolymer. Suitable copolymers of ethylene and vinyl acetate are commercially available, for example, under the trade name of Escorene® (from Exxon Mobil), under the trade name of Primeva® (from Repsol Quimica S.A.), under the trade name of Evatane® (from Arkema Functional Polyolefins), under the trade name of Greenflex® from Eni versalis S.p.A., and under the trade name of Levapren® from Arlanxeo GmbH.

According to one or more embodiments, the at least one polymer P1 is an ethylene vinyl acetate copolymer, preferably having a content of a structural unit derived from vinyl acetate in the range of 4-70 wt.-%, more preferably 6-50 wt.-%, even more preferably 8-30 wt.-%, based on the weight of the copolymer According to one or more further embodiments, the at least one polymer P1 is polyvinylchloride resin, preferably having a K-value determined by using the method as described in ISO 1628-2-1998 standard in the range of 50-85, more preferably 65-75. The K-value is a measure of the polymerization grade of the PVC-resin and it is determined from the viscosity values of the PVC homopolymer as virgin resin, dissolved in cyclohexanone at 30° C.

In addition to the at least one polymer P1, the polymeric waterproofing layer may further contain one or more auxiliary components, such as, UV- and heat stabilizers, antioxidants, plasticizers, flame retardants, fillers, dyes, pigments, matting agents, antistatic agents, impact modifiers, biocides, and processing aids such as lubricants, slip agents, antiblock agents, and denest aids. The total amount of these auxiliary components is preferably not more than 50 wt.-%, more preferably not more than 35 wt.-%, most preferably not more than 15 wt.-%, based on the total weight of the polymeric waterproofing layer.

In embodiments in which the at least one polymer P1 is a polyvinylchloride resin, it may also be preferred that the polymeric waterproofing layer comprises at least 10 wt.-%, preferably at least 15 wt.-%, more preferably at least 25 wt.-%, based on the total weight of the polymeric waterproofing layer, of at least one plasticizer.

Typical plasticizers used in plasticized polyvinylchloride layers include, for example, linear and branched phthalates such as di-isononyl phthalate (DINP), di-nonyl phthalate (L9P), diallyl phthalate (DAP), di-2-ethylhexyl-phthalate (DEHP), dioctyl phthalate (DOP), diisodecyl phthalate (DIDP), and mixed linear phthalates (911P). Other suitable plasticizers include phthalate-free plasticizers, such as trimellitate plasticizers, adipic polyesters, and biochemical plasticizers. Examples of suitable biochemical plasticizers include epoxidized vegetable oils, for example, epoxidized soybean oil and epoxidized linseed oil and acetylated waxes and oils derived from plants, for example, acetylated castor wax and acetylated castor oil.

The waterproofing membrane may further contain additional layers, such as a "signal layer". Such layers are coated on one of the major exterior surfaces of the waterproofing layer in order to enable visual detection of damages of the waterproofing membrane that may occur during the installation process. The waterproofing membrane is preferably attached to the separation sheet such that the signal layer is facing away from the surface of the separation sheet. Preferably, the signal layer has a thickness of not more than 0.35 mm, more preferably not more than 0.25 mm.

The signal layer preferably comprises a polymer basis, which is identical or very similar with the polymer basis of the waterproofing membrane. The composition of the signal layer typically comprises a color pigment that allows good visibility under tunnel conditions, such as a yellow or orange color pigment. The color pigment is also selected such as provide a clear contrast between the colors of the signal layer and waterproofing membrane, which enables effective detection of damages of the waterproofing membrane by visual inspection means. In addition, it is possible but not mandatory, to formulate the signal layer with small amount of UV absorbers or titanium dioxide, in order to provide UV protection of the waterproofing membrane under prolonged exposure to sunlight, for example, due to exposed storage conditions.

The adhesive elements used for attaching the waterproofing membrane sheet to the separation sheet comprise first and second major adhesive surfaces and an adhesive layer composed of a pressure sensitive adhesive.

The term "adhesive surface" refers to a surface that has adhesive properties, for example, a self-sticking surface of an adhesive layer. Preferably, the first and second major adhesive surfaces form the first and second major exterior surfaces of the adhesive element. The "term exterior surface" refers here to the outermost surfaces of the adhesive element.

It is generally preferred that that the plurality of adhesive elements, once installed, are not connected to each other to form a continuous adhesive layer. The term "continuous adhesive layer" refers to layers consisting of one single area coated with an adhesive composition whereas the term "discontinuous adhesive layer" refers to layers consisting of two or more areas coated with an adhesive composition, which areas are not connected to each other to form a continuous layer.

It is furthermore preferred that the first major adhesive surface of the adhesive element is directly connected to the surface of the separation sheet and the second major adhesive surface of the adhesive element is directly connected to a first major exterior surface of the waterproofing membrane sheet. The expression "directly connected" is understood to mean in the context of the present invention that no further layer or substance is present between the layers, and that the opposing surfaces of the two layers are directly connected to each other or adhere to each other.

The adhesive element can be a strip of an adhesive tape, such as a strip of an adhesive transfer tape or strip of a double sided adhesive tape, obtained after removal of release liner(s), which are typically used in adhesive tapes to protect the major adhesive surfaces from fouling and other environmental factors. The term "adhesive transfer tape" refers to an adhesive tape that does not contain any carrier layers. These types of adhesive tapes are also known as "unsupported adhesive tapes". The term "double-sided adhesive tape" refers to an adhesive tape comprising a carrier layer and first and second adhesive layers coated on the opposite sides or the carrier layer. Suitable materials for the carrier layer include, for example, paper, plastic, fabric, and metal. Such adhesive elements can easily be applied by hand to the surface of the separation sheet or a waterproofing membrane sheet.

Furthermore, the adhesive element can be an adhesive coating, which has been applied on one of the major exterior surfaces of the waterproofing membrane during the production process of the waterproofing membrane. Use of such pre-applied adhesive coatings is, although entirely possible, not necessarily preferred since the presence of the pre-applied adhesive elements increases the complexity of the production process of the waterproofing membrane and thus the production costs. In addition, since the waterproofing membrane is cut into sheets at the construction site, positioning of the adhesive elements during manufacture of the waterproofing membrane is inherently challenging.

Figure 2:
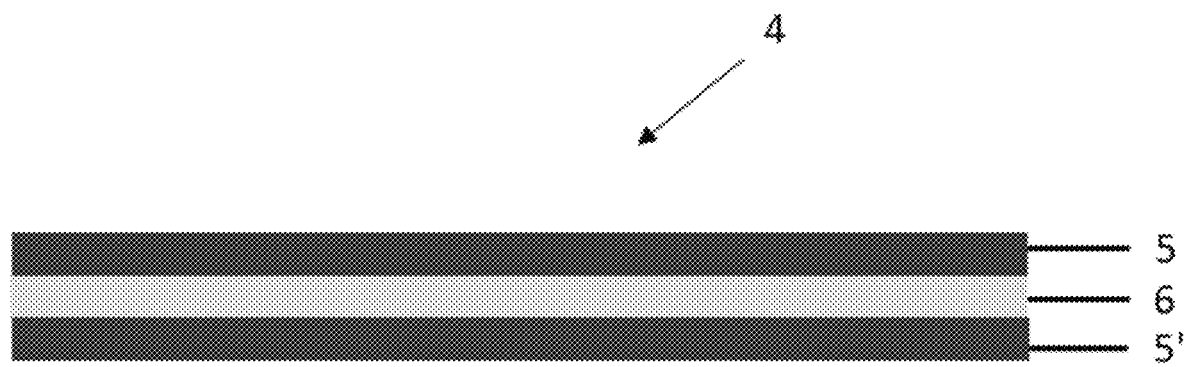
FIG. 2 shows a cross-section of another type of adhesive element (4) comprising a carrier layer (6), an adhesive layer (5), and a second adhesive layer (5') coated on the opposite sides of the carrier layer (6).

According to one or more embodiments, the adhesive element (4) is composed of the adhesive layer (5), as shown in FIG. 1. According to one or more further embodiments, the adhesive element (4) is composed of a carrier layer (6), the adhesive layer (5) and a second adhesive layer (5') coated on the opposite sides or the carrier layer (6), as shown in FIG. 2. The second adhesive layer (5') may have same of different composition and thickness as the adhesive layer (5).

It may be preferred that the adhesive layer of each adhesive element has thickness of at least 250 µm, preferably at least 300 µm, even more preferably at least 350 µm. According to one or more embodiments, the adhesive layer of each adhesive element has a thickness in the range of 150-1500 µm, preferably 250-1250 µm, more preferably 300-1000 µm, even more preferably 350-1000 µm, still more preferably 450-950 µm, still more preferably 500-900 µm. Adhesive elements having the thickness of the adhesive layer in the above cited ranges have been found out to provide sufficient adhesive strength between the separation sheet and the waterproofing membrane sheet, which is required in waterproofing of tunnels using thermoplastic waterproofing membranes.

The shape and size the adhesive elements is not subjected to any particular restrictions. The term *size" refers here to the surface area of the major exterior surfaces of each adhesive element. Suitable shapes for the adhesive elements include, for example, circular, square, hexagonal, rectangular, polygonal, parallelogram, rhomboidal, or oval shape.

Preferably, the adhesive elements have a size of not more than 0.75 m², more preferably not more than 0.5 m². According to one or more embodiments, the adhesive elements have a size in the range of 0.005-0.5 m², preferably 0.025-0.45 m², more preferably 0.035-0.35 m²

The preferred number of adhesive element per 1 m² of the separation sheet and/or the waterproofing membrane sheet is not particularly restricted, and it depends directly on the size of the adhesive elements and on the type of the adhesive layer(s). According one or more embodiments, the number of the adhesive elements is not more than 50 per 1 m² of the separation sheet and/or the waterproofing membrane sheet, preferably not more than 25 per 1 m² of the separation sheet and/or the waterproofing membrane sheet.

The adhesive layer of each adhesive element is composed of a pressure sensitive adhesive (PSA). The term "pressure sensitive adhesive" refers in the present disclosure to viscoelastic materials, which adhere immediately to almost any kind of substrates by application of light pressure and which are permanently tacky. The tackiness of an adhesive layer can be measured, for example, as a loop tack. Preferably, the pressure sensitive adhesive has a loop tack adhesion to a glass plate measured at a temperature of 23° C. of at least 2.5 N/25 mm, preferably at least 5 N/25 mm, more preferably at least 10 N/25 mm. The loop tack adhesion can be measured using a "FINAT test method no. 9 (FTM 9) as defined in FINAT Technical Handbook, 9th edition, published in 2014.

Suitable pressure sensitive adhesives to be used in the adhesive element include water-based, solvent-based, hot-melt, and crosslinked pressure sensitive adhesives, such as UV-cured pressure sensitive adhesives. The term "hot-melt pressure sensitive adhesive (HM-PSA)" refers in the present disclosure to solvent-free pressure sensitive adhesives, which are applied as a melt and which develop their adhesive strength upon cooling.

Suitable pressure sensitive adhesives include adhesives based on acrylic polymers, styrene block copolymers, amorphous polyolefins (APO), amorphous poly-alpha-olefins (APAO), vinyl ether polymers, bitumen, and elastomers such as, for example, styrene-butadiene rubber (SBR), ethylene propylene diene monomer (EPDM) rubber, butyl rubber, polyisoprene, polybutadiene, natural rubber, polychloroprene rubber, ethylene-propylene rubber (EPR), nitrile rubber, acrylic rubber, ethylene vinyl acetate rubber, and silicone rubber. In addition to the above-mentioned polymers, suitable pressure sensitive adhesive compositions typically comprise one or more additional components including, for example, tackifying resins, waxes, and additives, for example, UV-light absorption agents, UV- and heat stabilizers, optical brighteners, pigments, dyes, and desiccants.

According to one or more preferred embodiments, the adhesive layer of each adhesive element is composed of an acrylic pressure sensitive adhesive AC-PSA. The term "acrylic pressure sensitive adhesive" designates in the present disclosure pressure sensitive adhesives containing one or more acrylic polymers as the main polymer component.

Suitable acrylic pressure sensitive adhesives include, for example, water-based acrylic pressure sensitive adhesives, solvent-based acrylic pressure sensitive adhesives, acrylic hot-melt pressure sensitive adhesives (HM-PSA), and UV-cured acrylic pressure sensitive adhesives.

The term "water-based acrylic pressure sensitive adhesive" designates in the present disclosure pressure sensitive adhesive compositions comprising one or more acrylic polymers, which have been formulated as an aqueous dispersion, an aqueous emulsion, or as an aqueous colloidal suspension. The term "aqueous dispersion" or "aqueous emulsion" refers to dispersions or emulsions containing water as the main continuous (carrier) phase. Typically, a water-based acrylic pressure sensitive adhesive comprises surfactants to stabilize the hydrophobic polymer particles and to prevent these from coagulating to each other.

The term "solvent-based acrylic pressure sensitive adhesive" designates in the present disclosure pressure sensitive adhesive compositions comprising a solvent and one or more acrylic polymers, which are substantially completely dissolved in the solvent. Typically, the solvent comprises at least 20 wt.-%, preferably at least 30 wt.-%, more preferably at least 40 wt.-%, of the total weight of the adhesive composition. Suitable solvents for the solvent-based acrylic pressure sensitive adhesives include, for example, alcohols, aliphatic and aromatic hydrocarbons, ketones, esters, and mixtures thereof. It is possible to use only a single solvent or a mixture of two or more solvents.

Suitable solvent-based acrylic pressure sensitive adhesives are substantially water-free, for example, containing less than 10 wt.-%, preferably less than 5 wt.-%, more preferably less than 1 wt.-% of water, based on the total weight of the adhesive composition.

Water-based and a solvent-based pressure sensitive adhesives are applied on a surface a substrate as a wet adhesive film and then dried by allowing the water or solvent contained in the wet adhesive film to evaporate. In case of a water- or solvent-based pressure sensitive adhesive, the expression "the adhesive layer is composed of an pressure sensitive adhesive" is understood to mean that the adhesive layer has been obtained by applying the respective pressure sensitive adhesive composition as a wet film onto a surface of a substrate, for example onto one of the major surfaces of a transfer tape, followed by allowing the volatile components to evaporate.

The term "acrylic hot-melt pressure sensitive adhesive" refers in the present disclosure to solvent-free acrylic pressure sensitive adhesives, which are applied as a melt and which developed their final adhesive strength upon cooling. In case of a hot-melt pressure sensitive adhesive, the expression "the adhesive layer is composed of a pressure sensitive adhesive" is understood to mean that the adhesive layer has been obtained by applying the respective pressure sensitive adhesive as a melt onto a surface of a substrate, for example onto one of the major surfaces of a transfer tape, and allowing the applied adhesive composition to cool and to solidify.

The term "UV-cured acrylic pressure sensitive adhesive" refers in the present disclosure to UV-curable acrylic pressure sensitive adhesives, which have been cured by initiation of photochemical curing reactions. The term "curing" refers here to chemical reactions comprising forming of bonds resulting, for example, in chain extension and/or crosslinking of polymer chains. In case of an UV-cured pressure sensitive adhesive, the expression "the adhesive layer is composed of a pressure sensitive adhesive" is understood to mean that the adhesive layer has been obtained by applying an UV-curable pressure sensitive adhesive as an adhesive film onto a surface of a substrate, followed by subjecting the adhesive film to UV-radiation thereby to effect curing of the adhesive composition.

According to one or more embodiments, the acrylic pressure sensitive adhesive AC-PSA comprises at least 55 wt.-%, preferably at least 65 wt.-%, more preferably at least 75 wt.-%, even more preferably at least 85 wt.-%, based on the total weight of the acrylic pressure sensitive adhesive AC-PSA, of at least one acrylic polymer AP.

The term "acrylic polymer" designates in the present disclosure homopolymers, copolymers and higher interpolymers of an acrylic monomer with one or more further acrylic monomers and/or with one or more other ethylenically unsaturated monomers. The term "acrylic monomer" refers in the present disclosure to monomers having at least one (meth)acryloyl group in the molecule. The term "(meth) acryloyl" designates methacryloyl or acryloyl. Accordingly, "(meth)acrylic" designates methacrylic or acrylic. A (meth) acryloyl group is also known as (meth)acryl group.

Preferably, the at least one acrylic polymer AP has a glass transition temperature ($T_g$), determined by dynamical mechanical analysis (DMA) as the peak of the measured loss modulus (G") curve using an applied frequency of 1 Hz and a strain level of 0.1%, of below 0° C., preferably below −10° C. and/or a number average molecular weight ($M_n$) in the range of 50,000-1,000,000 g/mol, in particular 100,000-750,000 g/mol, more preferably 150,000-500,000 g/mol.

Examples of suitable acrylic monomers include, for example, (meth)acrylates, (meth)acrylic acid or derivatives thereof, for example, amides of (meth)acrylic acid or nitriles of (meth)acrylic acid, and (meth)acrylates with functional groups such as hydroxyalkyl (meth)acrylates, and hydroxyl group-containing (meth)acrylates.

Preferred acrylic polymers to be used as the at least one acrylic polymer AP contain acrylic monomers as the main monomer component, i.e. preferred acrylic polymers contain at least 30 wt.-%, preferably at least 40 wt.-%, more preferably at least 50 wt.-% of acrylic monomers, based on the weight of the acrylic polymer AP.

Particularly suitable acrylic polymers to be used as the at least one acrylic polymer AP contain alkyl (meth)acrylates, preferably (meth)acrylic acid esters of alcohols containing from 1 to 24 carbon atoms, as the main monomer component. There are preferably more than 25 wt.-%, preferably more than 35 wt.-% of these types of acrylic monomers in the acrylic polymer. Examples of particularly suitable alkyl (meth)acrylates include, for example, methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, as for example isobutyl acrylate, 2-ethylhexyl acrylate, 2-ethylhexyl methacrylate, isooctyl acrylate, isooctyl methacrylate, and also cyclohexyl methacrylate, isobornyl acrylate, isobornyl methacrylate or 3,5-dimethyladamantyl acrylate.

Suitable comonomers to be used with the alkyl (meth) acrylates include, for example, hydroxyl-group and hydroxyalkyl-group containing acrylic monomers.

Examples of suitable hydroxyl-group and hydroxyalkyl-group containing acrylic monomers include, for example, 2-hydroxyethyl(meth)acrylate, 2-hydroxypropyl(meth)acrylate, 3-hydroxypropyl (meth)acrylate, 2-hydroxybutyl (meth)acrylate, 4-hydroxybutyl butyl(meth)acrylate, 2-hydroxy-hexyl(meth)acrylate, 6-hydroxy hexyl(meth) acrylate, 8-hydroxyoctyl(meth)acrylate, 10-hydroxydecyl (meth)acrylate, 12-hydroxylauryl(meth)acrylate. Furthermore, suitable are (4-hydroxymethyl cyclohexyl)methyl acrylate, polypropylene glycol mono (meth)acrylate, N-hydroxyethyl (meth)acrylamide, and N-hydroxypropyl (meth) acrylamide. Hydroxyl-group and hydroxyalkyl-group containing acrylic monomers are preferably used in a range of 0.01-15 wt.-%, more preferably 0.1-10 wt.-%, based on the total amount of the monomers used in the synthesis of the acrylic polymer.

Other suitable comonomers for the at least one acrylic polymer AP include vinyl compounds, in particular vinyl esters, vinyl halides, vinylidene halides, ethylenically unsaturated hydrocarbons with functional groups, and nitriles of ethylenically unsaturated hydrocarbons. Examples of suitable vinyl compounds include, for example, maleic anhydride, styrene, styrenic compounds, beta-acryloyloxypropionic acid, vinylacetic acid, fumaric acid, crotonic acid, aconitic acid, trichloroacrylic acid, itaconic acid, and vinyl acetate In addition to the at least one acrylic polymer AP, the acrylic pressure sensitive adhesive AC-PSA may comprise one or more additional constituents including, for example, tackifying resins, waxes, and plasticizers as well as one or more additives such as, for example, UV-light absorption agents, UV- and heat stabilizers, optical brighteners, pigments, dyes, and desiccants. Preferably, the amount of such additional constituents and additives is not more than 25 wt.-%, more preferably not more than 15 wt.-%, even more preferably not more than 10 wt.-%, based on the total weight of the acrylic pressure sensitive adhesive.

According to one or more embodiments, the acrylic pressure sensitive adhesive AC-PSA is a water-based acrylic pressure sensitive adhesive.

According to one or more embodiments, the acrylic pressure sensitive adhesive AC-PSA is an at least partially cured water-based acrylic pressure sensitive adhesive composition comprising:

a1) 25-85 wt.-%, preferably 35-75 wt.-%, of at least one aqueous dispersion of the at least one acrylic polymer AP, a2) 0-5 wt.-%, preferably 0.1-3.5 wt.-%, of at least one curing agent CA, a3) 0-35 wt.-%, preferably 2.5-25 wt.-%, of at least one tackifying resin TR, and a4) 0-15 wt.-%, preferably 0.1-10 wt.-%, of one or more additives selected from the group consisting of plasticizers, adhesion promoters, pigments, fillers, antioxidants, UV-stabilizers, and UV-absorbers, all proportions being based on the total weight of water-based acrylic pressure sensitive adhesive composition.

Suitable aqueous dispersions of the at least one acrylic polymer AP are commercially available, for example, from BASF under the trade name of Acronal®, such as Acronal® A 240, Acronal® V 278 (acrylate), Acronal® V 212 (acrylate), Acronal® 81 D (acrylate), Acronal® 4 F(acrylate), Acronal® DS 5017 (pure acrylate), and Acronal® A 107 (pure acrylate).

The at least one curing agent CA is preferably a multifunctional acrylate selected from the group consisting of butanediol dimethacrylate, ethyleneglycol dimethacrylate, diethyleneglycol dimethacrylate, triethyleneglycol dimethacrylate, trimethylolpropane trimethacrylate, butanediol diacrylate, hexanediol diacrylate, trimethylolpropane triacrylate, and tripropyleneglycol diacrylate, trimethylolpropane ethoxy triacrylate, trimethylolpropane triacrylate, tripropylene glycol diacrylate, propylene glycol dimethacrylate, dipropylene glycol diacrylate, dipentaerythritol hydroxy pentaacrylate, neopentyl glycol propoxylate diacrylate, bisphenol A ethoxylate dimethacrylate, alkoxylated hexanediol diacrylate, ethoxylated bisphenol A diacrylate, ethoxylated bisphenol A dimethacrylate, ethoxylated trimethylolpropane triacrylate, propoxylated neopentyl glycol diacrylate, propoxylated glyceryl triacrylate, polybutadiene diacrylate, and polybutadiene dimethacrylate.

The term "tackifying resin" designates in the present disclosure resins that in general enhance the adhesion and/or tackiness of an adhesive composition. The term "tackiness" designates in the present disclosure the property of a substance of being sticky or adhesive by simple contact. The tackiness can be measured, for example, as a loop tack. Preferred tackifying resins are tackifying at a temperature of 25° C.

Examples of suitable tackifying resins to be used in the second adhesive composition include natural resins, synthetic resins and chemically modified natural resins.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomer or cycloaliphatic monomer include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, dicyclopentadiene, and terpenes. Aromatic monomer can include $C_8$, $C_9$, and $C_{10}$ aromatic monomer. Examples of aromatic monomer include styrene, indene, derivatives of styrene, derivatives of indene, coumarone and combinations thereof.

Particularly suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum-based feedstocks are referred in the present disclosure as "hydrocarbon resins" or "petroleum hydrocarbon resins". These include also pure monomer aromatic resins, which are made by polymerizing aromatic monomer feedstocks that have been purified to eliminate color causing contaminants and to precisely control the composition of the product. Hydrocarbon resins typically have a relatively low number average molecular weight ($M_n$), such in the range of 250-5000 g/mol and a glass transition temperature, determined by dynamical mechanical analysis (DMA) as the peak of the measured loss modulus (G") curve using an applied frequency of 1 Hz and a strain level of 0.1%, of above 0° C., preferably equal to or higher than 15° C., more preferably equal to or higher than 30° C.

Examples of suitable hydrocarbon resins include C5 aliphatic hydrocarbon resins, mixed C5/C9 aliphatic/aromatic hydrocarbon resins, aromatic modified C5 aliphatic hydrocarbon resins, cycloaliphatic hydrocarbon resins, mixed C5 aliphatic/cycloaliphatic hydrocarbon resins, mixed C9 aromatic/cycloaliphatic hydrocarbon resins, mixed C5 aliphatic/cycloaliphatic/C9 aromatic hydrocarbon resins, aromatic modified cycloaliphatic hydrocarbon resins, C9 aromatic hydrocarbon resins, polyterpene resins, and copolymers and terpolymers of natural terpenes as well hydrogenated versions of the aforementioned hydrocarbon resins. The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Suitable hydrocarbon resins are commercially available, for example, under the trade name of Wingtack® series, Wingtack® Plus, Wingtack® Extra, and Wingtack® STS (all from Cray Valley); under the trade name of Escorez® 1000 series, Escorez® 2000 series, and Escorez® 5000 series (all from Exxon Mobile Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

According to one or more embodiments, the acrylic pressure sensitive adhesive AC-PSA is an UV-cured acrylic pressure sensitive adhesive or an UV-cured acrylic hot-melt pressure sensitive adhesive (HM-PSA).

These types of adhesives have been found out to be suitable for use in the adhesive layer and the second adhesive layer since they have a broader operating window in terms of minimum and maximum application temperature. Furthermore, UV-cured acrylic pressure sensitive adhesives have been found out to maintain their adhesive strength at higher temperatures compared to non-cured acrylic pressure sensitive adhesives. Finally, UV-cured acrylic pressure sensitive adhesives have been found out to allow adjustments in the formulation to achieve greater tackiness even at low temperatures.

According to one or more embodiments, the acrylic pressure sensitive adhesive AC-PSA is an at least partially cured UV-curable acrylic pressure sensitive adhesive composition comprising:

b1) At least 65 wt.-%, preferably at least 85 wt.-%, of the at least acrylic polymer AP, b2) 0.01-5 wt.-%, preferably 0.1-1 wt.-%, of the at least one curing agent CA, b3) 0.1-5 wt.-%, preferably 0.25-2.5 wt.-%, of at least one photo initiator PI, and b4) 0-30 wt.-%, preferably 5.0-20 wt.-%, of the at least one tackifying resin TR, all proportions being based on the total weight of the UV-curable acrylic pressure sensitive adhesive composition.

Suitable compounds to be used as the at least one photo initiator PI include, for example, benzoic ethers, dialkoxy-acetophenones, alpha-hydroxycyclohexyl aryl ketones, alpha-ketophenylacetate esters, benzyldialkylketals, chloro- and alkylthioxanthones and alpha-amino- and alpha-hydroxyalkyl aryl ketones.

According to one or more further embodiments, the acrylic pressure sensitive adhesive AC-PSA is an UV-cured acrylic hot-melt pressure sensitive adhesive (HM-PSA), wherein the at least one acrylic polymer AP comprises polymerized units that serve as photoinitiators. Suitable polymerized units that serve as photo initiators may be obtained by using copolymerizable photo initiators, such as acetophenone and benzophenone derivatives.

According to one or more embodiments, the acrylic pressure sensitive adhesive AC-PSA is an at least partially cured UV-curable acrylic hot-melt pressure sensitive adhesive composition comprising:

c1) At least 65 wt.-%, preferably at least 85 wt.-%, of at least one UV-curable acrylic polymer UV-AP having a photo initiator group, c2) 0-15 wt.-% of at least one reactive diluent, and c3) 0-20 wt.-% of at least one filler and/or at least one flame retardant, all proportions being based on the total weight of UV-curable acrylic hot-melt pressure sensitive adhesive composition.

The at least one UV-curable acrylic polymer UV-AP may contain 0.05-10 wt.-%, preferably 0.1-2 wt.-%, more preferably 0.1-1.0 wt.-%, based on the weight of the polymer, of ethylenically unsaturated compounds having a photo initiator group.

Suitable UV-curable acrylic hot-melt pressure sensitive adhesives are commercially available, for example, under the trade name of acResin® (from BASF), such as AcResin® 250; under the trade name of AroCure® (form Ashland Chemical), and under the trade name of NovaMeltRC® (from NovaMelt).

According to one or more embodiments, step ii) of the method for waterproofing a substrate comprises the following steps:

ii1) Providing a strip of an adhesive tape having a first and second major adhesive surface, ii2) Contacting the first major adhesive surface of said strip with the surface of the separation sheet (2) and applying a pressure to effect adhesive bonding between the separation sheet (2) and said strip, ii3) Contacting the second major adhesive surface of said strip with a surface of the waterproofing membrane sheet (3) and applying pressure to effect adhesive bonding between the waterproofing membrane sheet and said strip.

The order of steps ii2) and ii3) is not restricted, i.e. step ii2) can be conducted before step ii3), or vice versa.

The adhesive tape is preferably an adhesive transfer tape of a double-sided adhesive tape comprising the adhesive layer of the adhesive element.

According to one or more embodiments, the adhesive tape comprises a release liner covering the first or second major adhesive surface of the adhesive tape and step ii2) is preceded by a further step of removing the release liner or step ii3) is preceded by a further step of removing the release liner.

The release liners are typically used to prevent premature unwanted adhesion and to protect adhesive surfaces from moisture, fouling, and other environmental factors. In case the adhesive tape is provided in form of rolls, the release liner enables ease of unwind without sticking of the adhesive to the back side of the adhesive tape. Suitable materials for release liners include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents. The thickness of the release liner is typically not more than 100 µm, preferably 25-100 µm, such as 30-90 µm.

Preferably, steps ii1) to ii3) of the method for waterproofing a substrate are repeated until a sufficient adhesive bond strength has been obtained between the separation sheet and the waterproofing membrane sheet.

The method for waterproofing a substrate may still contain a further steps of:

iii) Attaching a second separation sheet to the surface of the substrate and iv) Attaching a second waterproofing membrane sheet to a surface of the second separation sheet by means of a plurality of the adhesive elements.

The second separation sheet is preferably attached to the surface of the substrate such that the long edges of adjacent separation sheets are overlapped to form an overlap seam. Furthermore, the second waterproofing membrane is preferably attached to the second separation sheet such that the long edges of the adjacent waterproofing membrane sheets are overlapped to form an overlap seam. The overlap seams can then be sealed by heat-welding or by using adhesive means.

The waterproofed structure obtained by using the method of the present invention comprises several separation sheets and waterproofing membrane sheets, which together form a continuous waterproofing seal against the penetration of water and moisture. Typically, a layer of concrete is applied to the outer surface of the waterproofing seal. The layer of concrete can be a blinding concrete layer, an inner concrete lining layer of a tunnel, a tunnel tubbing segment, or a shotcrete layer.

The preferences given above for the separation sheet, the waterproofing membrane, waterproofing membrane sheet, and the adhesive elements, apply equally to all aspects of the present invention unless otherwise stated.

Another subject of the present invention is a waterproofed structure comprising a substrate (1), a separation sheet (2) attached to a surface of the substrate (1), and a waterproofing membrane sheet (3) attached to a surface of the separation sheet (2) via a plurality of adhesive elements (4) having a first and second major adhesive surface, wherein the separation sheet (2) is a non-woven fabric sheet or an embossed polyolefin membrane sheet and each adhesive element (4) comprises an adhesive layer (5) composed of a pressure sensitive adhesive.

Figure 3:
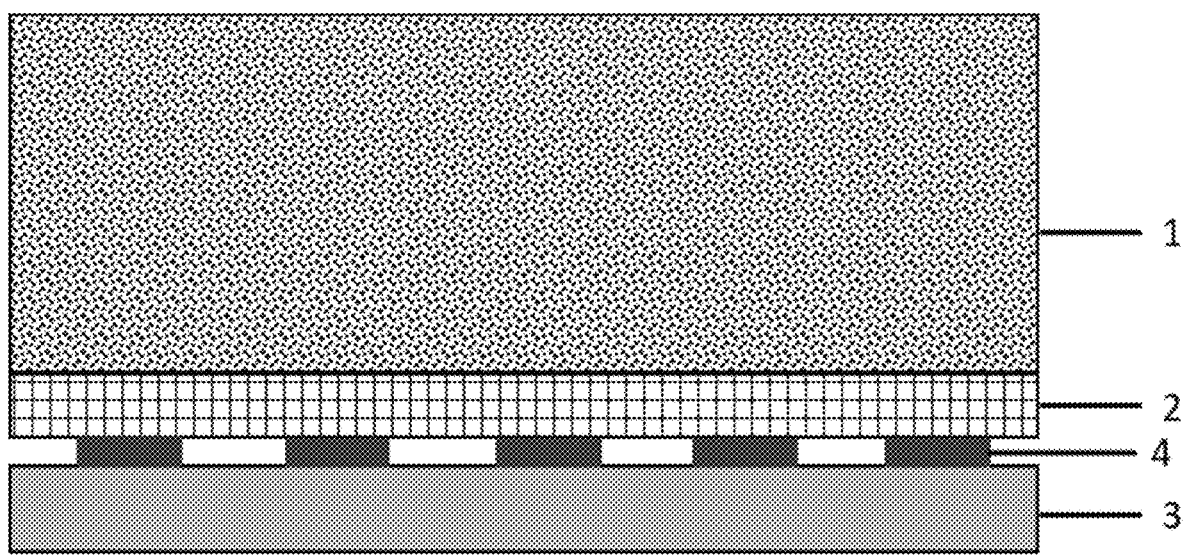
FIG. 3 shows a cross-section of a waterproofed structure comprising a substrate (1), separation sheet (2), and a waterproofing membrane sheet (3), wherein the separation sheet (2) is attached to a surface of the substrate (1) and the waterproofing membrane sheet (3) is attached to a surface of the separation sheet (2) via a plurality of adhesive elements (4).

A cross-section of a waterproofed structure according to the present invention is shown in FIG. 3.

According to one or more embodiments, at least 1%, preferably at least 5%, such as 5-35%, preferably 10-30%, of a first major exterior surface of the waterproofing membrane sheet is attached to the surface of the separation sheet via the plurality of adhesive elements.

The substrate is preferably a concrete substrate, more preferably an outer concrete lining layer of a tunnel, a tunnel tubbing segment, or a shotcrete layer.

It may be preferred that the adhesive layer of each adhesive element has thickness of at least 250 µm, preferably at least 300 µm, even more preferably at least 350 µm. According to one or more embodiments, the adhesive layer has a thickness in the range of 150-1500 µm, preferably 250-1250 µm, more preferably 300-1000 µm, even more preferably 350-1000 µm, still more preferably 450-950 µm, still more preferably 500-900 µm.

Preferably, the adhesive elements have a size of not more than 0.75 m², more preferably not more than 0.5 m². According to one or more embodiments, the adhesive elements have a size in the range of 0.005-0.5 m², preferably 0.025-0.45 m², more preferably 0.035-0.35 m²

The preferred number of adhesive elements per 1 m² of the separation sheet and/or the waterproofing membrane sheet is not particularly restricted, and it depends directly on the size of the adhesive elements and on the type of the adhesive layer(s). According one or more embodiments, the number of the adhesive elements is not more than 50 per 1 m² of the separation sheet and/or the waterproofing membrane sheet, preferably not more than 25 per 1 m² of the separation sheet and/or the waterproofing membrane sheet.

Figure 4:
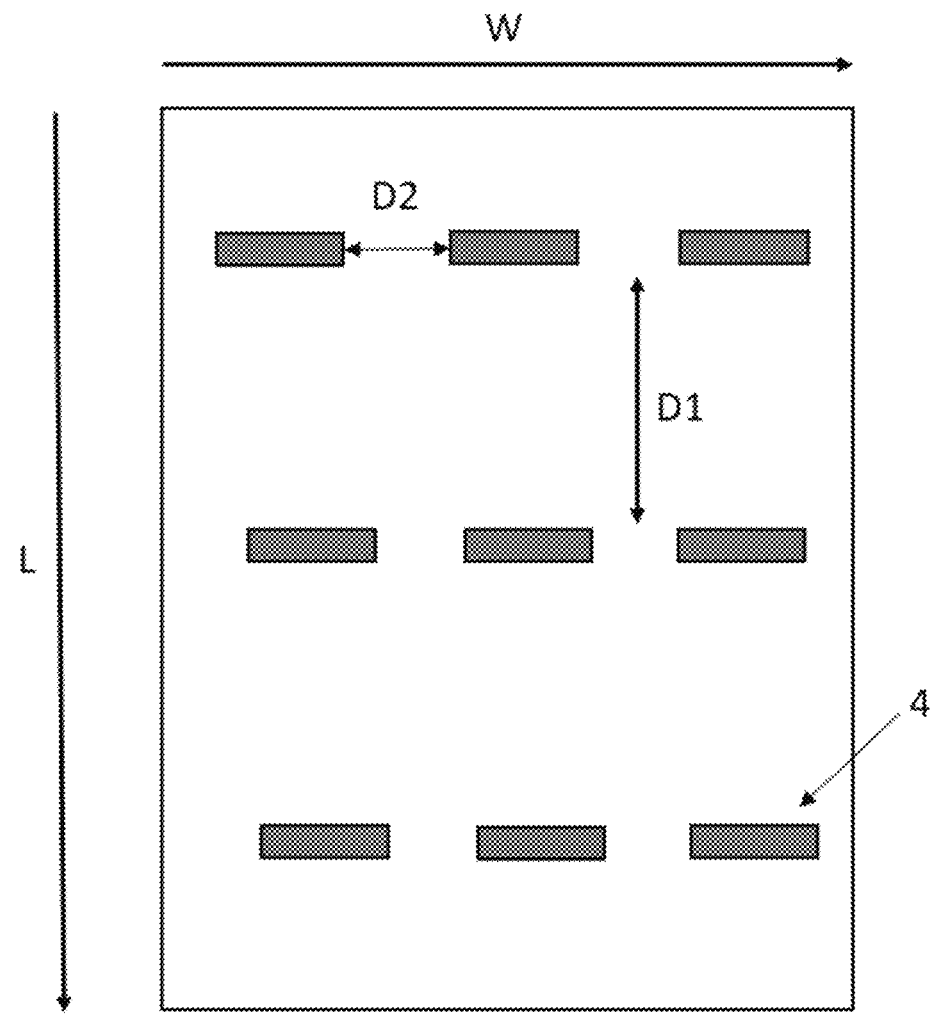
FIG. 4 shows one possible arrangement for the positioning of the adhesive elements (4) between the separation sheet (2) and the waterproofing membrane sheet (3) in the waterproofed structure of FIG. 3, where the adhesive elements (4) have a rectangular shape and the distance between adjacent adhesive elements (4) measured in the longitudinal direction (L) of the waterproofing membrane sheet is D1 and the distance between two adjacent adhesive elements (4) in the transverse direction (W) of the waterproofing membrane sheet is D2.

According to one embodiments, the adhesive elements have a rectangular shape with a length in the range of 5-50 cm, preferably 10-35 cm and a width in the range of 1-15 cm, preferably 2.5-10 cm and wherein the distance D1 between two adjacent adhesive elements measured in the longitudinal direction (L) of the waterproofing membrane sheet is in the range of 25-100 cm, preferably 35-75 cm and/or wherein the distance D2 between two adjacent adhesive elements in the transverse direction (W) of the waterproofing membrane sheet is in the range of 5-35 cm, preferably 10-25 cm. A schematic presentation of this type of arrangement of the adhesive elements between the separation sheet and the waterproofing membrane sheet in the waterproofed structure of FIG. 3 is presented in FIG. 4.

Figure 5:
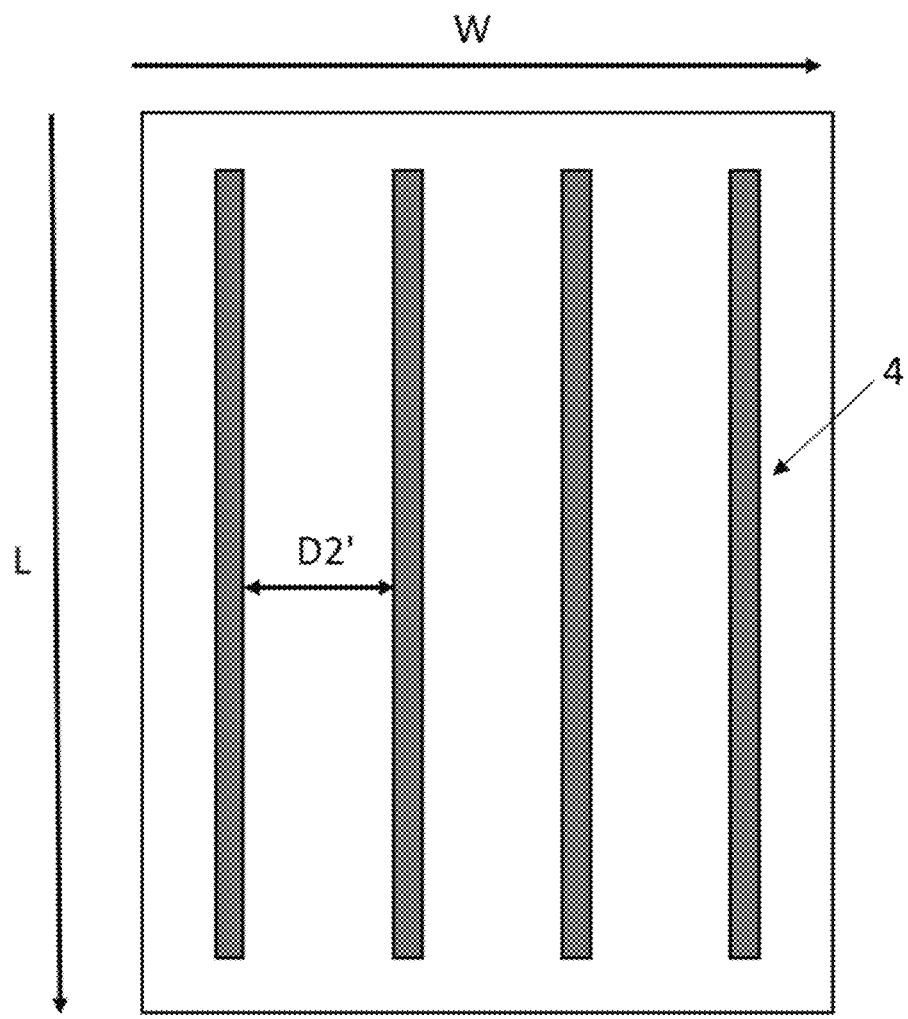
FIG. 5 shows another possible arrangement for the positioning of the adhesive elements (4) between the separation sheet (2) and the waterproofing membrane sheet (3) in the waterproofed structure of FIG. 3, where the adhesive elements (4) have a rectangular shape and the distance between two adjacent adhesive elements (4) measured in the transverse direction (W) of the waterproofing membrane sheet is D2' and the adhesive elements (4) are positioned such that their longitudinal edges coincide with the longitudinal edges of the waterproofing membrane sheet.

According to one further embodiments, the adhesive elements have a rectangular shape with a length that is 50-95%, preferably 60-90 wt.-%, of the length of the waterproofing membrane sheet and a width in the range of 1-15 cm, preferably 2.5-10 cm and wherein the distance D2' between two adjacent adhesive elements in the transverse direction (W) of the waterproofing membrane sheet is in the range of 15-150 cm, preferably 35-100 cm and the adhesive elements are preferably positioned such that their longitudinal edges substantially coincide with the longitudinal edges of the waterproofing membrane sheet. A schematic presentation of this type of the arrangement of the adhesive elements between the separation sheet and the waterproofing membrane sheet in the waterproofed structure of FIG. 3 is presented in FIG. 5.

According to one or more embodiments, the waterproofed structure has been obtained by using the method of waterproofing a substrate according to the present invention.

EXAMPLES

Preparation of Test Specimens

Strips of a TPO-based single-ply waterproofing membrane (Sikaplan WT 2200, from Sika AG) were attached to strips of non-woven fabric separation sheet (Sikaplan W Felt PP 1000, from Sika AG) using three different types of adhesive elements as described below. The strips of the waterproofing membrane and the separation sheet had a width of 5 cm.

The first adhesive element was a strip of an adhesive transfer tape comprising a layer of UV-cured acrylic pressure sensitive adhesive having a thickness of 0.5 mm. The adhesive transfer tape is commercially available under the trade name of SikaRoof® Tape P (from Sika AG).

The second adhesive element was composed of an adhesive layer of an UV-cured acrylic hot-melt adhesive. The adhesive element was prepared by stacking one or more adhesive films of an UV-curable acrylic hot-melt pressure sensitive adhesive AcResin® A 250 UV (from BASF) on a surface of the waterproofing membrane strip. The adhesive films were originally provided in form of an adhesive transfer tape and each applied film was cured with a dosage of UV-C radiation of 100 mJ/cm² before application of the next adhesive film in case several superimposed adhesive films were required to provide the adhesive layer having a thickness of >0.15 mm. The reason for using an incremental adhesive coating technique in providing the second type of adhesive element was that thick layers of UV-cured acrylic hot-melt adhesives cannot be easily produced due to the limited penetration depth of UV-C radiation.

The third adhesive element was composed of an adhesive layer of a water-based acrylic pressure sensitive adhesive. The adhesive layer was prepared by coating one or more films of a water-based acrylic dispersion adhesive Acronal® A 240 (from BASF) on a surface of the waterproofing membrane strip. The applied adhesive films had a thickness of 0.15 mm and each film was cured by drying before coating of the next film in case several superimposed adhesive films were required to provide the adhesive layer with a thickness of >0.15 mm.

Peel Strength 180°

Peel resistances while peeling the separation sheet from the surface of the waterproofing membrane were measured at angle of 180° at a temperature of 23±2° C. using a Zwick tensile tester and a cross head speed of 100 mm/min and. The results for the peel strength measurements are shown in Table 1.

Before measuring the peel strengths, the test specimens prepared by using the procedure as described above were stored for 4 weeks at a temperature of 50° C. (100% relative humidity).

TABLE 1

| Example | Adhesive type | Thickness of adhesive layer [mm] | 180° peel force [N/50 mm] |
| --- | --- | --- | --- |
| Ex-1 | SikaRoof Tape P | 0.5 | 63 |
| Ex-2 | AcResin ® A 250 UV | 0.15 | 16 |
| Ex-3 | AcResin ® A 250 UV | 0.3 | 31 |
| Ex-4 | AcResin ® A 250 UV | 0.45 | 34 |
| Ex-5 | AcResin ® A 250 UV | 0.6 | 63 |
| Ex-6 | AcResin ® A 250 UV | 0.75 | 79 |
| Ex-7 | AcResin ® A 250 UV | 0.9 | 81 |
| Ex-8 | Acronal ® A 240 | 0.15 | 8 |
| Ex-9 | Acronal ® A 240 | 0.3 | 33 |
| Ex-10 | Acronal ® A 240 | 0.45 | 35 |
| Ex-11 | Acronal ® A 240 | 0.6 | 45 |
| Ex-12 | Acronal ® A 240 | 0.75 | 37 |
| Ex-13 | Acronal ® A 240 | 0.9 | 38 |

CONCLUSIONS

In case an adhesive element having a width of ca. 30 cm is used for attaching a waterproofing membrane sheet to a separation sheet in tunnel waterproofing applications, a minimum holding power of ca. 20 kg per width of the adhesive element is typically required. Therefore, each adhesive element preferably ha a peel strength of ca. 30 N/5 cm in order to qualify for use in a tunnel waterproofing application. Based on the results presented in Table 1, a preferred thickness of the adhesive layer composed of an acrylic pressure sensitive adhesive would, therefore, be ca. 0.25 mm.

The invention claimed is:

1. A method for waterproofing a substrate comprising steps of:
   i) attaching a separation sheet to a surface of the substrate and
   ii) attaching a waterproofing membrane sheet to a surface of the separation sheet by a plurality of adhesive elements having a first and second major adhesive surface, wherein
      the separation sheet is a non-woven fabric sheet or an embossed polyolefin membrane sheet and each adhesive element comprises an adhesive layer,
      the adhesive layer is composed of a pressure sensitive adhesive, and the adhesive layer of each adhesive element has a thickness of at least 300 μm.

2. The method according to claim 1, wherein step i) is conducted before step ii).

3. The method according to claim 1, wherein the separation sheet is attached to the surface of the substrate by using mechanical fixation means or adhesive means.

4. The method according to claim 1, wherein the separation sheet is a non-woven fabric sheet having a mass per unit area of at least 250 g/m$^2$.

5. The method according to claim 1, wherein the substrate is a concrete substrate.

6. The method according to claim 1, wherein the waterproofing membrane sheet comprises at least one polymeric waterproofing layer.

7. The method according to claim 1, wherein the adhesive elements are not connected to each to form a continuous layer of an adhesive.

8. The method according to claim 1, wherein the first major adhesive surface of each adhesive element is directly connected to the surface of the separation sheet and the second major adhesive surface of each adhesive element is directly connected to a surface the waterproofing membrane sheet.

9. The method according to claim 1, wherein the adhesive layer is composed of an acrylic pressure sensitive adhesive AC-PSA.

10. The method according to claim 1, wherein step ii) comprises the following steps:
   ii1) providing a strip of an adhesive tape having a first and second major adhesive surface,
   ii2) contacting the first major adhesive surface of said strip with the surface of the separation sheet and applying a pressure to effect adhesive bonding between the separation sheet and said strip,
   ii3) contacting the second major adhesive surface of said strip with a surface of the waterproofing membrane sheet and applying pressure to effect adhesive bonding between the waterproofing membrane sheet and said strip.

11. The method according to claim 10, wherein step ii2) is conducted before step ii3) or vice versa.

12. The method according to claim 10, wherein steps ii1) to ii3) are repeated until a sufficient adhesive bond strength has been obtained between the separation sheet and the waterproofing membrane sheet.

13. The method according to claim 1, wherein a number of the plurality of adhesive elements is not more than 50 per 1 m$^2$ of the separation sheet.

14. The method according to claim 1, wherein the plurality of the adhesive elements have a rectangular shape with a length, extending in a length direction, in a range of 5-50 cm and a width, extending in a width direction, in a range of 1-15 cm,
   a distance between two adjacent adhesive elements measured in the width direction of the waterproofing membrane sheet is in a range of 25-100 cm, and
   a distance between two adjacent adhesive elements length direction of the waterproofing membrane sheet is in the range of 5-35 cm.

15. The method according to claim 1, wherein the plurality of the adhesive elements have a rectangular shape with a length, extending in a length direction, that is 50-95% of a length of the waterproofing membrane sheet in a length direction and a width, extending in a width direction, in the range of 1-15 cm, and
   a distance between two adjacent adhesive elements in the width direction of the waterproofing membrane sheet is in a range of 15-150 cm.

16. A waterproofed structure comprising a substrate, a separation sheet attached to a surface of the substrate, and a waterproofing membrane sheet attached to a surface of the separation sheet via a plurality of adhesive elements having a first and second major adhesive surface, wherein the separation sheet is a non-woven fabric sheet or an embossed polyolefin membrane sheet and each adhesive element comprises an adhesive layer, the adhesive layer is composed of a pressure sensitive adhesive, and the adhesive layer of each adhesive element has a thickness of at least 300 μm.

17. The waterproofed structure according to claim 16, wherein at least 1% of a first major exterior surface of the waterproofing membrane sheet is attached to the surface of the separation sheet via the plurality of adhesive elements.

* * * * *